Feb. 25, 1958   F. J. LA VOIE   2,824,753
VEHICLE REAR FENDER LAMP ASSEMBLY AND
CLOSURE FOR FUEL INLET
Filed Jan. 13, 1955   4 Sheets-Sheet 1
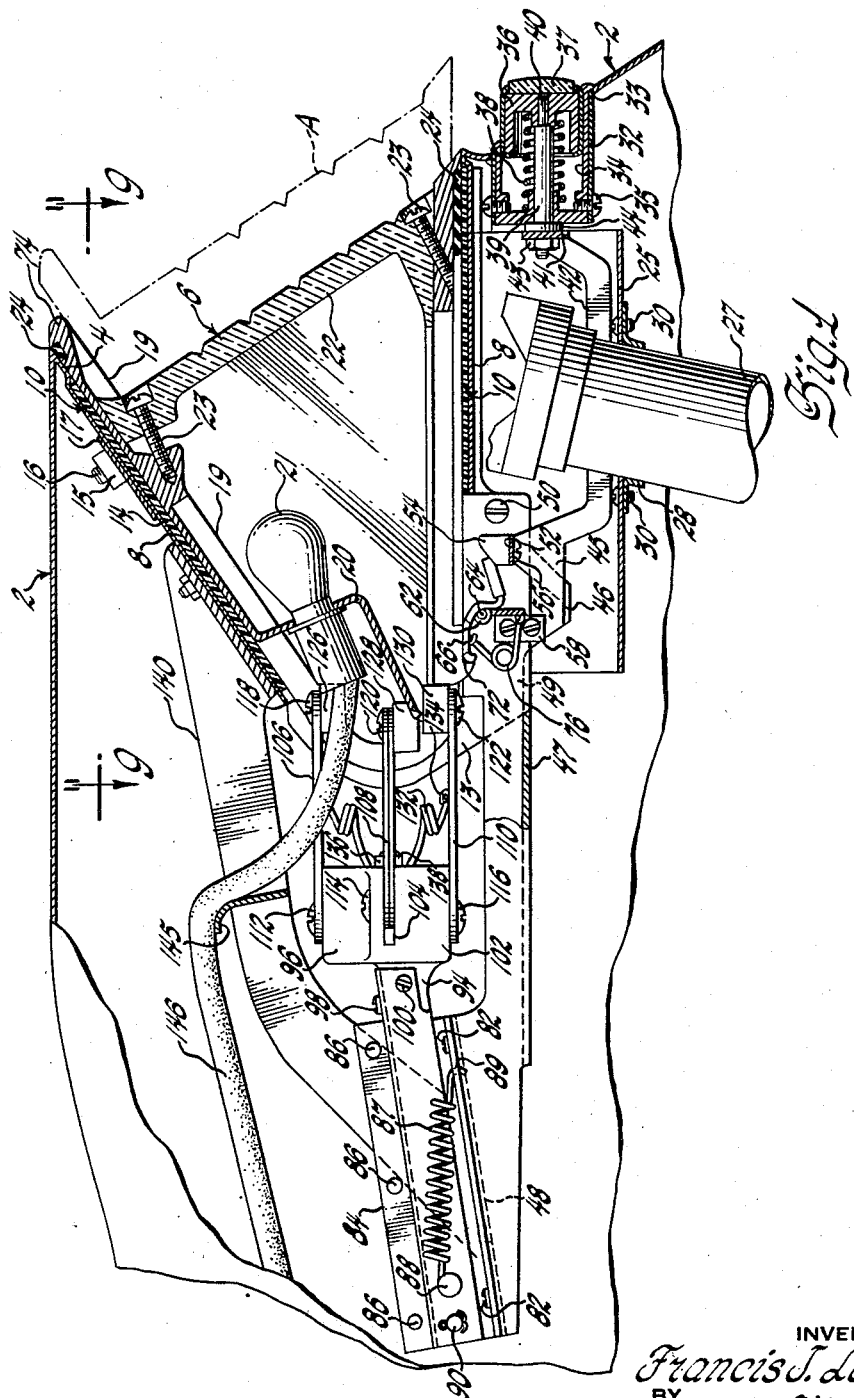
INVENTOR
Francis J. LaVoie
BY
Paul Fitzpatrick
ATTORNEY

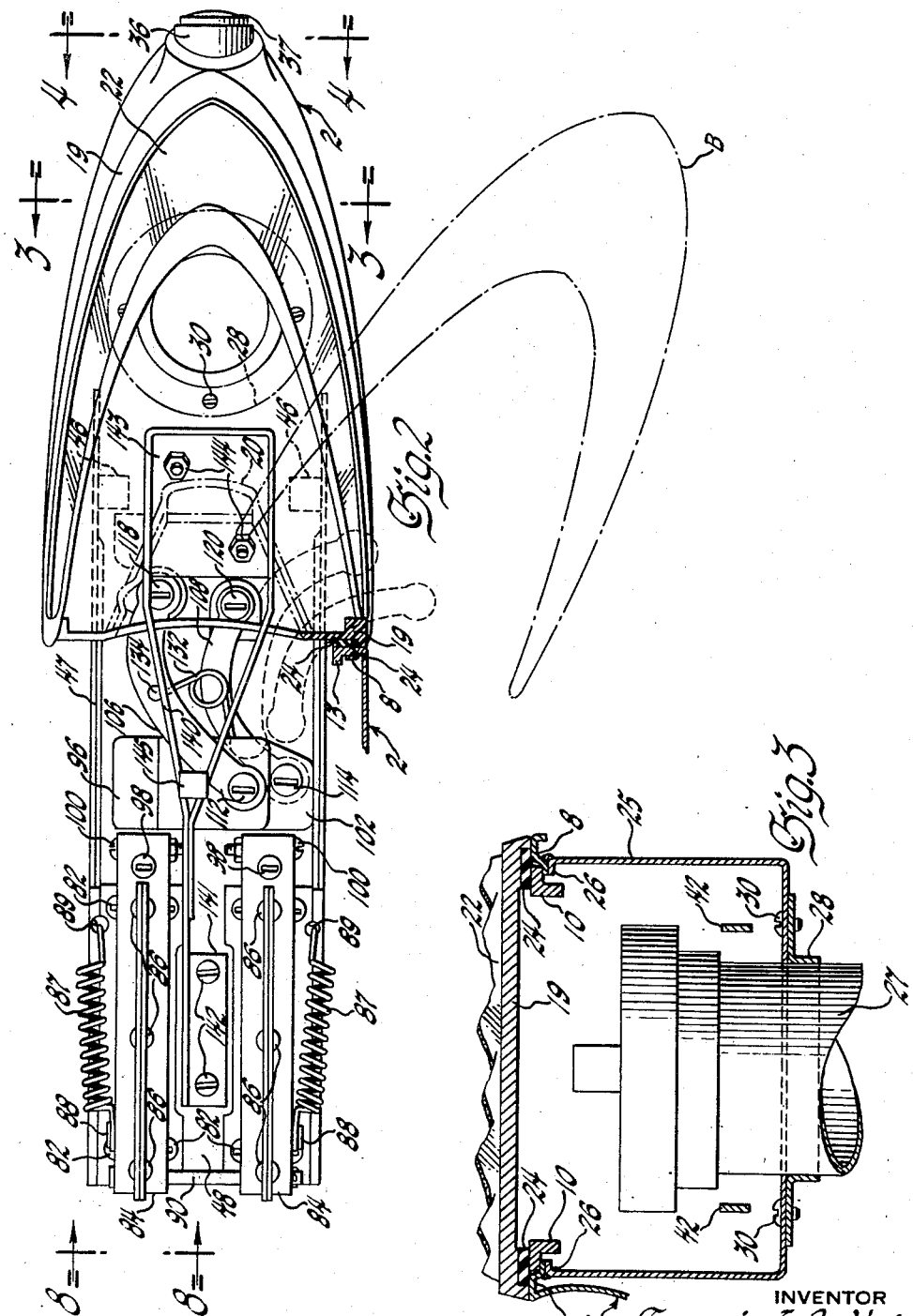

Feb. 25, 1958 F. J. LA VOIE 2,824,753
VEHICLE REAR FENDER LAMP ASSEMBLY AND
CLOSURE FOR FUEL INLET
Filed Jan. 13, 1955 4 Sheets-Sheet 3
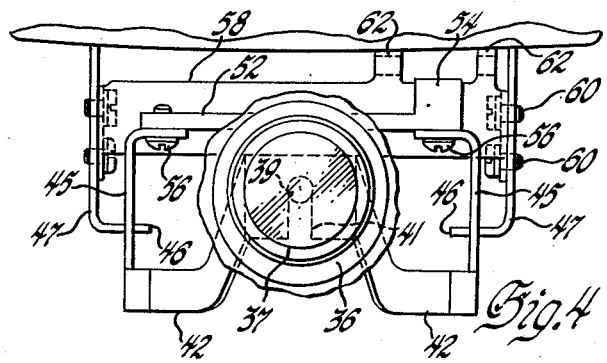
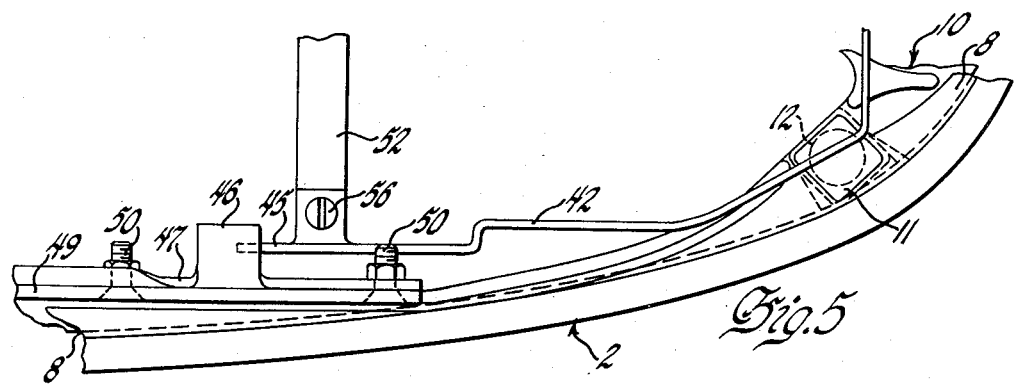
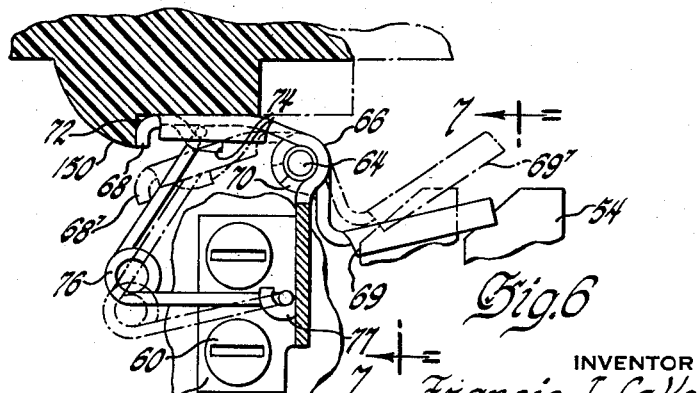
INVENTOR
*Francis J. LaVoie*
BY
*Paul Fitzpatrick*
ATTORNEY

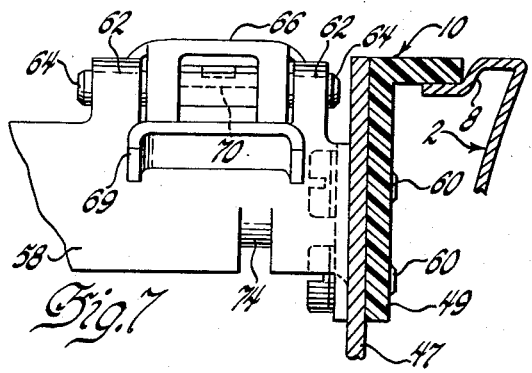
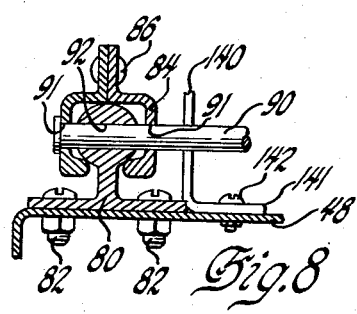
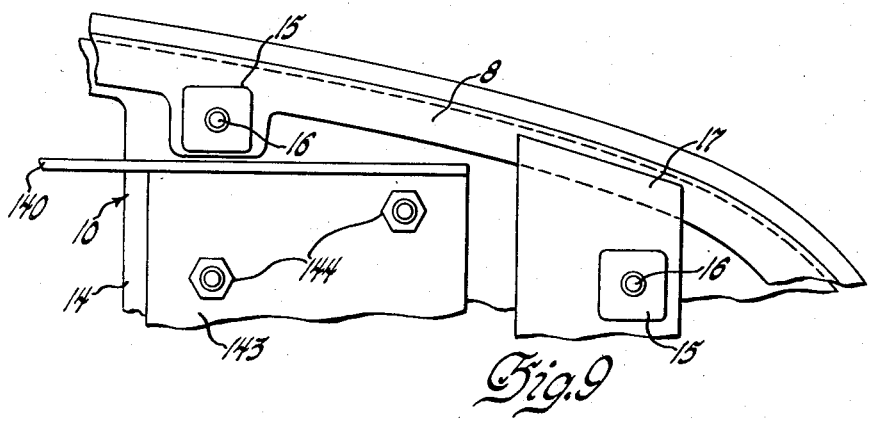
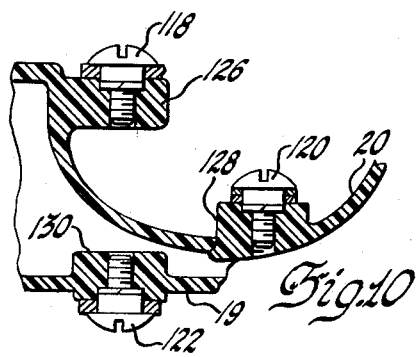
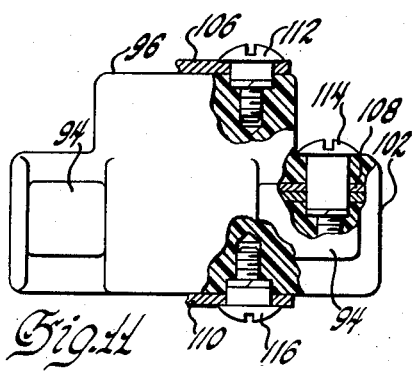

United States Patent Office 2,824,753
Patented Feb. 25, 1958

2,824,753

VEHICLE REAR FENDER LAMP ASSEMBLY AND CLOSURE FOR FUEL INLET

Francis J. La Voie, Detroit, Mich., assignor to General Motors Corporation, Detroit, Mich., a corporation of Delaware Application January 13, 1955, Serial No. 481,533

12 Claims. (Cl. 280—152)

This invention relates to a vehicle closure and more particularly to a vehicle lamp assembly fitting within an apertured portion of the vehicle body to conceal the fuel inlet.

In the preferred embodiment of this invention a vehicle lamp assembly including a lamp housing, a lamp, and a lens therefor, fits within an apertured portion of the rear fender of the vehicle and conceals the fuel inlet within the fender adjacent the apertured portion. A pair of spaced tracks oblique mounted within the fender forward of the apertured portion slidably support a pair of channels, and tension springs provided between the tracks and channels bias the channels outwardly along the tracks. A pivot block supported by the ends of the channels is pivotally connected to the lamp assembly by three vertically spaced links, and hairpin compression springs between the two outer links and the pivot block bias the lamp assembly to one side of the apertured portion. A stop on the pivot block engaging the central link resists the action of the springs and prevents movement of the assembly to the one side of the apertured portion. Latching mechanism retains the assembly within the apertured portion to conceal the fuel inlet. When the latch is released, the tension springs bias the channels outwardly along the tracks to bodily move the lamp assembly obliquely outwardly of the apertured portion of the fender. A stop provided between the channels and tracks limits the extent of travel of the channels. The lamp assembly is manually moved from its position obliquely outwardly of the apertured portion of the fender to a position to the other side of the apertured portion by means of the links pivotally interconnecting the assembly and the pivot block to allow access to the fuel inlet. The hairpin compression springs tend to retain the assembly in the position obliquely outwardly of the apertured portion of the fender and resist movement thereof to the position to the other side of the apertured portion. However, after the assembly has been moved to the latter position, the springs go over center and tend to retain the assembly in this position.

An object of this invention is to provide an improved vehicle lamp assembly fitting within an apertured portion of the vehicle body to conceal the fuel inlet. Another object of this invention is to provide an improved vehicle lamp assembly fitting within an apertured portion of the vehicle body to conceal the fuel inlet and bodily movable to one side of the apertured portion to allow access to the fuel inlet.

These and other objects of this invention will be readily apparent from the following specification and drawings, in which:

Figure 1 is a side elevational view of the lamp assembly mounted within a rear fender of the vehicle, with certain parts of the fender and the lamp assembly being cut away;

Figure 2 is a top plan view of the lamp assembly with portions of the fender being cut away;

Figure 3 is a view taken on the plane indicated by line 3—3 of Figure 2;

Figure 4 is a view taken on the plane indicated by line 4—4 of Figure 2 showing a portion of the latching mechanism for the lamp assembly;

Figure 5 is a bottom plan view of another portion of the latching mechanism;

Figure 6 is an enlarged view of another portion of the latching mechanism;

Figure 7 is a rear elevational view of the latching mechanism taken on the plane indicated by line 7—7 of Figure 6;

Figure 8 is a partial view taken on the plane indicated by line 8—8 of Figure 2;

Figure 9 is a partial view taken on the plane indicated by line 9—9 of Figure 1;

Figure 10 is a sectional view through the forward portion of the lamp housing showing the pivotal connections between the links and the lamp assembly; and Figure 11 is a view of the pivot block with parts thereof being cut away to show the pivotal connections between the pivot block and the links.

Referring now to Figures 1, 3, 5, 7, and 9 of the drawings, the rear fender 2 of the vehicle is provided with an opening 4 to receive the tail lamp assembly 6 within the fender and a continuous offset flange 8 extending inwardly from the edge of the opening to provide a seat for a die-cast mounting frame 10. The mounting frame extends entirely around the opening and includes a lower portion of L-shape cross section, Figures 3 and 7, secured to flange 8 by caged nut 11 and countersunk bolt 12, Figure 5, a forward portion 13, of L-shape cross section, Figure 2, and an upper portion including an integral flat plate 14 secured by caged nuts 15 and countersunk bolts 16 to flange 8 and support strut 17 spot welded to flange 8.

The lamp assembly 6 includes a die-cast lamp housing 19 having an integral cup-shaped portion 20, Figures 1, 2, and 10, supporting a lamp 21, and a lens 22 bolted to the housing at 23. The housing is supported within opening 4 by flange 8, as shown in Figure 3, and a continuous seal 24 mounted within a recessed portion of the housing, Figures 1, 2, and 3, seals the housing within the opening. A channel 25 has flanged upper edges 26, Figure 3, welded to flange 8 to support the channel within the fender, and a fuel inlet 27 extending through an opening in the lower wall of the channel is supported within the channel by collar 28 bolted to the channel at 30, Figures 1 and 3. Thus, it can be seen that the lamp assembly conceals the fuel inlet in closed position and must be bodily moved outwardly of the fender opening to gain access to the fuel inlet.

Referring now to Figures 1, 4, 5, 6, and 7, the latching mechanism for the tail lamp assembly 6 will be described. An open cylinder 32 having its rear edge welded at 33 to an opening in the fender mounts a die-cast cylinder 34 bolted to cylinder 32 at 35. A push button assembly 36 including a reflector button 37 is slidably mounted within cylinder 34 and biased outwardly of the cylinder by a coil spring 38 bearing against the base of cylinder 34 and the push button assembly 36. A rod 39 having a reduced shank portion 40 fitting within the push button assembly extends through the base of cylinder 34 and is secured to the rear slotted portion 41, Figure 4 of a U-shaped latch actuating member 42 by nut 43 and washer 44 fitting on a threaded reduced shank portion of the rod.

Latch actuating member 42 extends forwardly to either side of the fuel inlet 27, Figure 3, and terminates in triangular-shaped portions 45 slidably supported on flanges 46 of the sides 47 of the lower frame support, Figures 1 and 4. The lower frame support is of U-shape and includes a forward angular flat base portion 48, Figures 1 and 2, and sides 47 bolted to flanges 49 of the mounting frame 10 at 50, Figures 1 and 5. A bar 52 having a wedge portion 54 is bolted to the flanged upper ends of triangular portions 45 at 56, Figures 1 and 4. A strut 58, Figures 4 and 7, extends between the sides 47 of the lower frame support and is bolted thereto and to flanges 49 of the mounting frame 10 at 60. A pair of upwardly extending hinge supports 62 formed on strut 58 support a hinge pin 64. Latch member 66, Figures 6 and 7, having a latch portion 68 and a latch releasing portion 69 is rotatably mounted on pin 64 by struck-out portion 70 extending underneath and partially around pin 64. A hairpin compression spring 76 having one leg hooked under struck-out tab 74 of latch member 66 and the other leg hooked under struck-out tab 77 of strut 58 biases latch member 66 upwardly and latch portion 68 to latched position. The latch releasing portion 69 of latch 66 is adapted to be engaged by wedge portion 54 of bar 52 to release the latch from engagement with a shoulder 72 formed on the lower surface of the die-cast lamp housing 19 of the lamp assembly 6. Thus, when the push button assembly 36 is moved inwardly within cylinder 34, latch actuating member 42 is moved forwardly of the vehicle until wedge portion 54 moves latch releasing portion 69 upwardly as shown in dotted lines at 69' in Figure 6 to disengage latch portion 68 from shoulder 72 as shown in dotted lines at 68'.

Referring now to Figures 1, 2, and 8, a pair of spaced tracks 80 are bolted at 82 to the angular base 48 of the lower frame support. The upper portions of the tracks are of circular cross section as shown in Figure 8 and slidably support a pair of channels 84 formed of two offset channel members riveted together at 86. A pair of tension springs 87 having one end hooked around shoulders 88 on channels 84 and the other end hooked into openings 89 in the base flanges of tracks 80 and the base 48 of the lower frame support bias channels 84 outwardly along tracks 80. A shouldered rod 90, Figure 8, extends through aligned openings 91 in the sides of channels 84 and aligned slots 92 in tracks 80 to limit the outward movement of the channels along the tracks. When the channels move outward the desired distance, the rod abuts against the forward edge of the slots to provide a limit stop.

The rear ends of channels 84 are secured to shouldered portions 94 of pivot block 96 by screws 98 and bolts 100, Figures 1 and 2. The pivot block includes a shoulder portion 102 extending to one side of the block as shown in Figure 11 and a slot 104 is formed in this portion. Three vertically spaced links 106, 108, and 110 are pivotally secured to the pivot block at 112, 114, and 116 with the central link 108 mounted within slot 104 formed in shoulder portion 102. The free ends of these links are pivotally secured to the lamp housing 19 at 118, 120, and 122, respectively, Figure 10. Shoulders 126 and 128 are provided within the cup-shaped portion 20 to receive bolts 118 and 120 and a similar shoulder 130 is formed on the lower outer portion of the lamp housing substantially in alignment with shoulder 126 to receive bolt 122.

A pair of hairpin compression springs 132, Figures 1 and 2, having one end hooked around studs 134 on the upper and lower links 106 and 110 and the other end hooked within openings formed in the pivot block continually bias the links and the lamp assembly 6 to one side of the apertured portion, which would be counterclockwise as viewed in Figure 2. A stop 136, Figure 1, secured to the rear face of the pivot block at 138 engages the central link 108 to retain the lamp housing in its position as shown in Figure 2 against the action of springs 132. An upper frame support member 140 having a forward flange 141, Figure 2, bolted to base 48 at 142, and a rear flat plate portion 143 bolted to the integral flat plate 14 of mounting frame 10 at 144, Figures 2 and 9, provides additional reinforcement for the base 48 of the lower frame support. An arcuate tab 145, Figures 1 and 2, welded to support 140 supports a lead-in wire 146 for lamp 21.

The operation of the lamp assembly is as follows: The operation of the latching mechanism has already been described and when the latch portion 68 of latch 66 is released from engagement with shoulder 72, springs 87 bias channels 84 outwardly along tracks 80 to move the lamp assembly 6 obliquely outwardly of the opening 4 of the fender to the position A shown in Figure 1 in dotted lines out of registry with the opening of the fender. In the specific embodiment of the invention shown in the drawings, the lamp assembly moves rearwardly approximately ¾" and upwardly approximately ⅛" to the position A shown in dotted lines. The upward movement of the lamp assembly as it moves outwardly from the opening of the fender provides clearance between the lamp assembly and the opening. After the lamp assembly has been moved to this position, it is manually grasped and moved to one side of the apertured portion to position B as shown in dotted lines in Figure 2 to gain access to the fuel inlet for filling or otherwise. During the outward movement of the lamp assembly, springs 132 bias the lamp assembly to the opposite side of the opening as hereinbefore described and, therefore, resist manual movement of the lamp assembly to the position B on the one side of the apertured portion shown in dotted lines in Figure 2. However, after the lamp assembly has been moved to position B, the springs go over center and now tend to retain the assembly in this position and resist movement thereof to the other position A out of registry with the opening of the fender. To close the lamp assembly, it is manually moved from its position B shown in dotted lines in Figure 2 to its position A shown in dotted lines in Figure 1 and then manually moved inwardly within the opening of the fender until the arcuate cam surface 150 of shoulder 72 biases latch portion 68 of latch 66 downwardly as it passes over the latch portion and then spring 76 returns the latch portion to latched position as shown in Figure 2 to retain the assembly within the apertured portion.

While a specific embodiment of this invention has been shown and described, various changes and modifications may be made within the scope and spirit of the invention.

I claim:

1. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, and actuating means for bodily moving said assembly obliquely outwardly of said apertured portion to a position out of registry with said apertured portion, said means including pivotal connecting means therebetween and said assembly whereby said assembly may be moved relative to said means from said position to a position laterally of said apertured portion allowing access to the fuel inlet.

2. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, and actuating means including track means mounted within the vehicle body for bodily moving said assembly obliquely outwardly of said apertured portion to a position out of registry with said apertured portion, said assembly being bodily movable from said position to a position on one side of said apertured portion allowing access to the fuel inlet.

3. In a vertical body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, and actuating means including track means mounted within said vehicle body for bodily moving said assembly obliquely outwardly of said apertured portion to a position out of registry with said apertured portion, said actuating means including pivotal connecting means therebetween and said assembly whereby said assembly may be moved relative to said means from said position to a position laterally of said apertured portion allowing access to the fuel inlet.

4. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, actuating means including track means mounted within said vehicle body, said actuating means being pivotally connected to said assembly for bodily moving said assembly obliquely outwardly of said apertured portion to a position out of registry with said apertured portion, said assembly being bodily movable from said position to a position laterally of said apertured portion allowing access to the fuel inlet, and resilient means resisting movement of said assembly from said position out of registry to said position laterally of said apertured portion.

5. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, actuating means including track means mounted within said vehicle body for bodily moving said assembly obliquely outwardly of said apertured portion to a position out of registry with said apertured portion, said actuating means including pivotal connecting means therebetween and said assembly whereby said assembly may be moved relative to said means from said position to a position laterally of said apertured portion allowing access to the fuel inlet, and resilient means resisting movement of said assembly from said position out of registry to said position laterally of said apertured portion and operable to retain said assembly in said latter position after said housing has been bodily moved to said latter position.

6. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, actuating means including track means mounted within said vehicle body, said actuating means being pivotally connected to said assembly for bodily moving said assembly obliquely outwardly of said apertured portion to a position out of registry with said apertured portion, resilient means urging said assembly to one side of said apertured portion as said assembly is moved to said position out of registry with said apertured portion, and means preventing movement of said assembly to said one side of said apertured portion as said housing is moved to said position out of registry wherdeby said resilient means tend to retain said assembly in said position out of registry with said apertured portion.

7. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, actuating means including track means mounted within said vehicle body for bodily moving said assembly obliquely outwardly of said apertured portion to a position out of registry with said apertured portion, said actuating means including pivotal connecting means therebetween and said assembly whereby said assembly may be moved relative to said means from said position to a position laterally of said apertured portion allowing access to the fuel inlet, resilient means urging said assembly to the other side of said apertured portion as said assembly is moved to said position out of registry, and means preventing movement of said assembly to said other side of said apertured portion as said assembly is moved to said position out of registry whereby said resilient means tend to retain said assembly in said position out of registry and to resist movement thereof to said one side of said apertured portion, said resilient means tending to retain said assembly in said position to one side of said apertured portion after said assembly has been moved to said position.

8. In a vehicle body having an apertured portion and a fuel inlet adjacent the apertured portion, the combination comprising, a vehicle lamp assembly including a lamp housing, a lamp, and a lens therefor, fitting within said apertured portion and concealing said inlet in the closed position of said assembly, and means for bodily moving said assembly outwardly of said apertured portion to a position in spaced relationship with the closed position thereof, said means including connecting means operatively connected to said assembly and allowing relative movement between said means and said assembly whereby said assembly may be moved from said position to a position to one side of said apertured portion allowing access to said fuel inlet.

9. In a vehicle body having an apertured portion and a fuel inlet adjacent the apertured portion, the combination comprising, a vehicle lamp assembly including a lamp housing, a lamp, and a lens therefor, fitting within said apertured portion and concealing said inlet in the closed position of said assembly, support means on said body adjacent said apertured portion, means mounted on said support means for bodily shiftable movement relative thereto outwardly of said apertured portion, connecting means operatively interconnecting said means and said assembly whereby said assembly may be bodily shifted outwardly of said apertured portion to a position in spaced relationship with the closed position thereof, resilient means continually biasing said means outwardly of said apertured portion, and latch means operable to retain said assembly within said apertured portion against the action of said resilient means.

10. In a vehicle body having an apertured portion and a fuel inlet adjacent the apertured portion, the combination comprising, a vehicle lamp assembly including a lamp housing, a lamp, and a lens therefor fitting within said apertured portion and concealing said inlet in the closed position of said assembly, guide means on said body adjacent said apertured portion defining a path of movement outwardly therefrom, support means mounted on said guide means for bodily movement relative thereto and outwardly of said apertured portion, and means operatively connecting said support means and said assembly for bodily moving said assembly outwardly of said apertured portion to a position to one side thereof allowing access to said fuel inlet.

11. In a vehicle body having an apertured portion and a fuel inlet adjacent the apertured portion, the combination comprising a vehicle lamp assembly including a lamp housing, a lamp, and a lens therefor, fitting within said apertured portion and concealing said inlet in the closed position of said assembly, means for bodily moving said assembly outwardly of said apertured portion to a first position in spaced relationship with the closed position thereof, said means including pivotal connecting means therebetween and said assembly whereby said assembly may be bodily moved laterally of said apertured portion from said first position to a position to one side of said apertured portion allowing access to said fuel inlet, and resilient means resisting movement of said assembly from said first position to said position laterally of said apertured portion.

12. In a vehicle body having an apertured portion and a fuel inlet adjacent the apertured portion, the combination comprising, a vehicle lamp assembly including a lamp housing, a lamp, and a lens therefor, fitting within said apertured portion and concealing said inlet in the closed position of said assembly, means for bodily moving said assembly outwardly of said apertured portion to a position in spaced relationship with the closed position thereof, said means including pivotal connecting means therebetween and said assembly whereby said assembly may be bodily moved laterally of said apertured portion from said position to a position to one side of said apertured portion allowing access to said fuel inlet, and resilient means resisting movement of said assembly from said first position to said position laterally of said apertured portion, said resilient means being operable to retain said assembly in said latter position after said assembly has been moved to said latter position.

References Cited in the file of this patent

UNITED STATES PATENTS

| | | |
|---|---|---|
| 2,314,710 | Keller | Mar. 23, 1943 |
| 2,529,361 | Abbas | Nov. 7, 1950 |
| 2,606,772 | Mead | Aug. 12, 1952 |

FOREIGN PATENTS

| | | |
|---|---|---|
| 16,084 of 1913 | Great Britain | Apr. 30, 1914 |

U. S. DEPARTMENT OF COMMERCE
PATENT OFFICE

CERTIFICATE OF CORRECTION

Patent No. 2,824,753     Francis J. La Voie     February 25, 1958

It is hereby certified that error appears in the printed specification of the above numbered patent requiring correction and that the said Letters Patent should read as corrected below.

Column 4, line 73, for "vertical" read -- vehicle --; column 5, line 63, for "wherdeby" read -- whereby --.

Signed and sealed this 10th day of June 1958.

(SEAL)
Attest:
KARL H. AXLINE
Attesting Officer

ROBERT C. WATSON
Commissioner of Patents